J. M. Parsons,
Corn Planter.
No. 111,774. Patented Feb. 14, 1871.
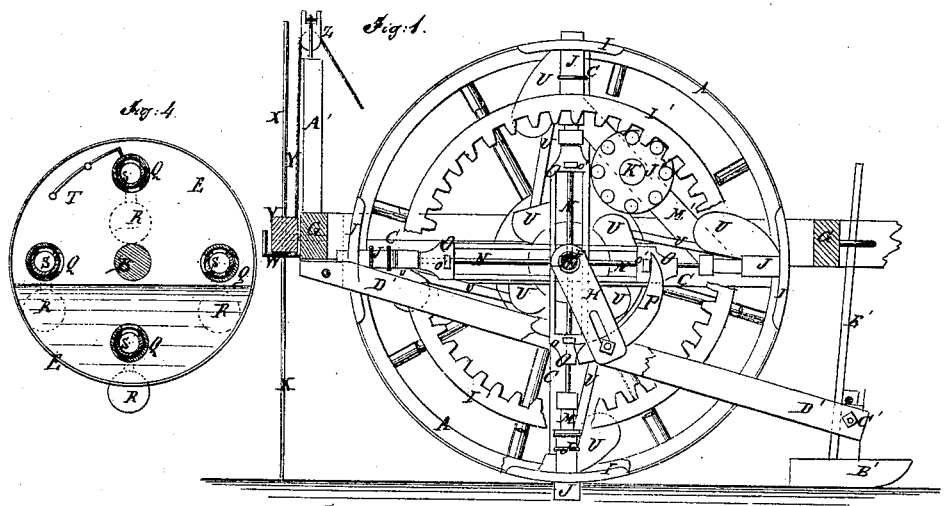
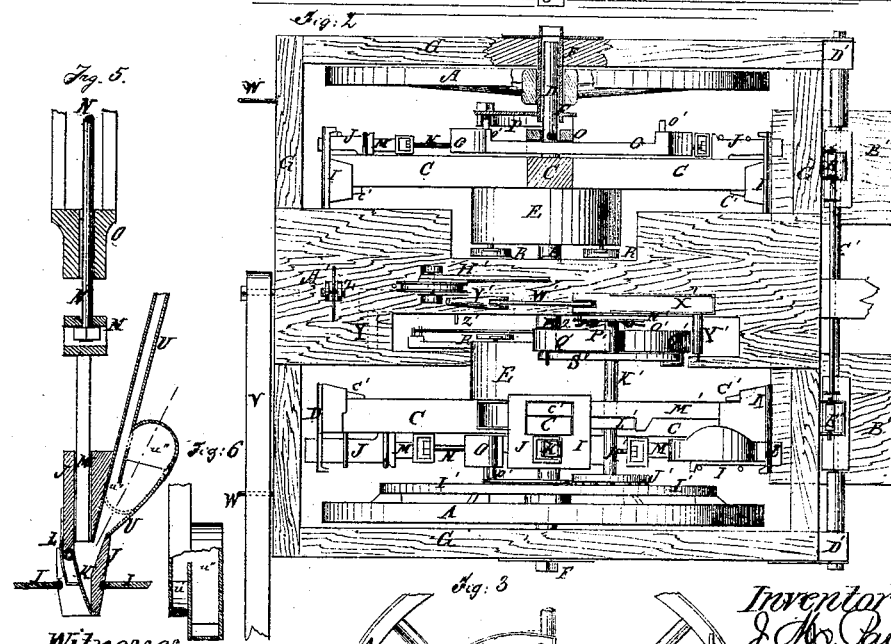
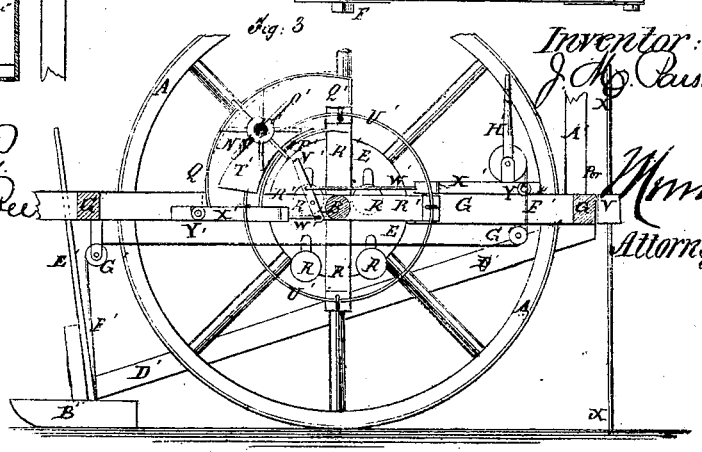

United States Patent Office.

JOHN MORSE PARSONS, OF CHARLES CITY, IOWA.

Letters Patent No. 111,774, dated February 14, 1871.

IMPROVEMENT IN CORN-PLANTERS.

The Schedule referred to in these Letters Patent and making part of the same.

*To all whom it may concern:*

Be it known that I, JOHN MORSE PARSONS, of Charles City, in the county of Floyd and State of Iowa, have invented a new and useful Improvement in Corn-Planters; and I do hereby declare that the following is a full, clear, and exact description thereof, which will enable others skilled in the art to make and use the same, reference being had to the accompanying drawing forming part of this specification.

Figure 1 is a side view of my improved corn-planter, partly in section, to show the construction.

Figure 2 is a top view of the same, parts being broken away to show the construction.

Figure 3 is a detail sectional view of the same, illustrating the spacing device.

Figure 4 is a detail sectional view of one of the feed-drums.

Figure 5 is a detail sectional view, illustrating the construction of the conductor-spout and discharger.

Figure 6 is a detail sectional view of the conductor-spout.

In the drawing—

A indicates the wheels;

B, the axle-tree; and

D, the journals of the latter, which revolve in thimbles F, which pass through the side bars of the frame G.

C C are bars, and

E E, seed-boxes, through which the axle passes, and all of which, including the wheels A, revolve together.

Stamping-plates I are attached to the outer ends of bars C, for the purpose of marking the ground about each hill, and to hold the dischargers which pass through them securely in place.

The dischargers J are secured to the arms or bars C by projections formed upon them, which enter mortises in said arms, and the wedges $c'$, which enter openings in the plates I.

The ends of the dischargers J are closed by hinged plates K, held closed by plate-springs L.

M M are plungers, which enter the dischargers J, and each one is connected with that on the opposite end of the bar C by a rod, N, which passes through the journals D.

The rods N are secured to the plungers by screw-nuts.

Weights O, slotted to allow the journals to pass through, are arranged to slide on rods N, and thus, at the proper time, to drive the plungers M (following the seed from the dischargers) into the ground.

Small projections are formed on the weights, which work in grooves in bars C.

This relieves the rods N of a portion of the strain on them.

To regulate the drop of the weights O, I employ projections $e'$ thereon, in connection with curved bars P, which may be adjusted by means of bolts in slots of the arms H, to give the weights greater or lesser throw.

Each seed-drum E is provided with four droppers, Q, whose ends, projecting beyond the inside plates of the drum, are weighted, to keep them always the same side up.

They revolve on tubes S, which project inward from the opposite side-plate of the drum, and are notched on the upper side of their recessed ends for the purpose of containing seed enough to form a hill.

The notches or holes are kept on the upper side as the machine advances, and become filled as the seed-drums E revolve.

T are small springs attached to the side of the drums for striking off any loose seed, thus leaving the holes in the droppers full each time.

Conductor-spouts U are attached to bars C, and shown as connecting the dischargers J and drums E.

These receive the seed of the droppers which falls through the holes in the tubes S as the drums revolve.

In its downward course the seed first reaches and is stopped by the partition $u^r$, and, as the arms C rise, it is passed around $u^1$ to the second partition, $u^2$.

The descent of the arms C takes it into the discharger J, where it is disposed of, as already described.

Without these partitions the seed would be required to descend from the drum to the discharger while the wheel was making about a quarter of a revolution, which would not give time enough to get all the seed into the discharger before the descent of the plunger.

I employ a device to mark out the next adjacent row, the same consisting of a bar, V, pivoted at one end to the rear cross-bar G, and carrying at the other a marking-bar, $x$.

The bar V is supported by hooks W, and is thrown from one side to the other by a cord $y$, which passes over a pulley, $z$, swiveled in post A', and thence extends to the driver's seat.

For smoothing the ground in front of bars C, I use smoothers B', pivoted to rods C', which connect the bars D', whose forward ends are pivoted to side bars G of the frame.

The smoothers are kept in proper position by bars E', whose upper ends pass through keepers, as shown in fig. 1.

Thus the smoothers may have a vertical but not a horizontal play.

A cord, F', is provided to raise the smoothers from the ground, and is suitably arranged to pass over pulleys G'; and connected with a hand-lever, H', (fig. 3.)

It is found in practice that, owing to the unevenness of the ground, and a slight slipping of the wheels upon their journals as the machine is drawn back and forth across the field, the transverse rows will get out of line unless the planter be provided with some device for straightening the said rows by lengthening or shortening the spaces occasionally, as may be necessary, to plant the hills in accurate check-row.

This object is effected in the following manner:

To one of the wheels A is attached an internally toothed gear-wheel, I', into the teeth of which mesh the teeth or cogs of the gear-wheel J' attached to the outer end of the shaft K'.

The middle part of the shaft K' revolves in bearings in the cross-bar L', the ends of which are pivoted to supports attached to the brace-bar M', the ends of which are secured to two of the arms C, so that the shaft K' may be tilted to throw the wheel J' out of gear with the wheel I'.

The inner end of the shaft K' has eight or more radial arms, N', attached to it, each arm being provided with a spring, O', upon its inner side, which springs, when the shaft K' is revolved in one direction, catch upon an inclined projection, P', formed upon the quadrant Q', the elasticity of said springs allowing them to pass the said inclined projection when revolving in the other direction.

The quadrant Q' is attached to the radial arms R', attached to the axletree B, or to the drum E, or to both, and is notched upon the middle part of its convex side, to receive and form a bearing for the inner part of the shaft K', in such a way that the outer ends of the arms N' may project a little beyond the quadrant Q', both upon its convex and concave sides.

The shaft K' is held down in the notch in the quadrant Q' by a spring, S', one end of which is secured to the side of the quadrant Q', the other end of which passes through a keeper attached to the side of the said quadrant, and the middle part of which rests upon the shaft K' with sufficient force to hold the said shaft K' in its bearings, except when pushed out by the inclined slide T'.

The inclined slide T' works in a groove or recess in the side of the quadrant Q', and is attached to a wire ring, U', which works in keepers or guides attached to the quadrant Q' and radial arms N', so that, by operating the said ring, the slide T' may be drawn beneath the inner end of the shaft K', to tilt it and throw the wheel J' out of gear with the wheel I'.

V' is a lever passing through and pivoted in a slot in a longitudinal cross-bar of the frame G.

To the upper and lower parts of the lever V', at equal distances from its pivoting point, are pivoted the inner ends of the connecting-rods W', the outer ends of which are pivoted to the inner ends of the slides X', which slide in ways or keepers attached to the cross-bar of the frame G, one of said slides being placed above and the other below the said cross-bar.

To the outer ends of the slides X', projecting beyond the plane of the quadrant Q', and opposite its convex face, are pivoted rollers Y', as shown in figs. 2 and 3.

To the sides of the slides X' are attached catches Z', projecting upon the concave side of the said quadrant.

By this construction, by moving the upper end of the lever V' forward, the catches Z' are brought into such a position as to catch upon the spring O' that is resting against the shoulder of the incline P', and lift it over the said incline, and carry it on until the next spring comes back to and strikes against the said shoulder.

The effect of this is to allow the arms C and their attachments to fall back a little, thus widening the spaces between the hills every time the arms N' are turned by the catches Z'.

By moving the upper end of the lever V' rearward, the rollers Y' are brought into such a position that they engage an arm, N', upon the convex side of the quadrant Q', moving said arm in the opposite direction for the distance of one-eighth of a circle.

The effect of this is to carry the arms C forward, thus narrowing the space between the hills every time the roller is brought into contact with an arm, N'.

The gear-wheel J is of such size, and the arms N of such number that, by said arms N coming in contact with the catches Z, or with the rollers Y, the arms C shall be set backward or forward about one and a half inch.

The sleeve F and the arm H are one casting, made from one pattern, and cast in the same mold.

In operating this machine the seed-drums E are partly filled with corn.

Having thus described my invention,

I claim as new and desire to secure by Letters Patent—

1. The combination of the arms C, axletree B, gudgeons D, thimbles or sleeves F, and wheels A with each other, for the purpose of supporting and operating the planting device, substantially as herein shown and described.

2. The seed-drums E, seed-droppers Q, weights R, short tubes S, and strikers T, in combination with each other and with the arms C and conductor-spouts U, for the purpose of receiving the seed and transmitting it to the said conductor-spouts in quantities to form the hills, substantially as herein shown and described.

3. The conductor-spouts U $u^1$ $u^2$, constructed substantially as herein shown and described, in combination with the seed-distributer E Q R S T, as set forth.

4. The dischargers J, clappers or plates K, spring L, plungers M, sliding rods N, sliding weights O, in combination with each other and with the conductor-spouts U, stamps I, arms C, and gudgeons D, substantially as herein shown and described, for the purpose of receiving the seed from the conductor-spouts U and introducing it into the ground, as set forth.

5. The combination of the arm H and curved stop and guide P with the thimbles or sleeves F and sliding weights O, for the purpose of holding the said weights, and dropping them at the proper time, substantially as herein shown and described, and for the purpose set forth.

6. The combination of the smoothers B' C' D' E' with the frame-work and operating parts of the planter, substantially as herein shown and described, and for the purpose set forth.

7. The spacing device, consisting of the gear-wheel I', gear-wheel J, tilting-shaft K, rock-bar L', arms N', springs O', inclined projection P', quadrant Q', spring S', lever V', connecting-rods W', slides X', rollers Y', and catches Z', in combination with each other and with the wheels A, arms C, and operating parts of the planter, substantially as herein shown and described, and for the purpose set forth.

8. The combination of the incline T' and wire ring U' with the quadrant Q' and tilting-shaft K' of the spacing device, substantially as herein shown and described, and for the purpose set forth.

JOHN MORSE PARSONS.

Witnesses:
JAMES H. PITCHER,
CHAS. E. SINGER.